(12) United States Patent
Weng et al.

(10) Patent No.: US 8,461,240 B2
(45) Date of Patent: Jun. 11, 2013

(54) ELASTOMERIC NANOCOMPOSITES, NANOCOMPOSITE COMPOSITIONS, AND METHODS OF MANUFACTURE

(75) Inventors: Weiqing Weng, Houston, TX (US); Michael Brendan Rodgers, Seabrook, TX (US); John Patrick Soisson, Houston, TX (US); Molly Westermann Johnston, Baytown, TX (US); Robert Norman Webb, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 198 days.

(21) Appl. No.: 12/771,775

(22) Filed: Apr. 30, 2010

(65) Prior Publication Data

US 2011/0265927 A1     Nov. 3, 2011

(51) Int. Cl.
*C08K 5/00* (2006.01)
*C08K 3/34* (2006.01)

(52) U.S. Cl.
USPC .......................... 524/236; 524/445

(58) Field of Classification Search
USPC ........................................................ 524/236
See application file for complete search history.

(56) References Cited

U.S. PATENT DOCUMENTS

| | | | |
|---|---|---|---|
| 6,057,396 A | 5/2000 | Lan et al. | |
| 6,521,690 B1 | 2/2003 | Ross et al. | |
| 6,586,500 B2 | 7/2003 | Bagrodia et al. | |
| 6,828,370 B2 * | 12/2004 | Lan et al. | 524/445 |
| 7,022,299 B2 | 4/2006 | Lin et al. | |
| 7,125,916 B2 | 10/2006 | Lin et al. | |
| 7,442,728 B2 | 10/2008 | Lin et al. | |
| 7,491,764 B2 * | 2/2009 | Dias et al. | 524/445 |
| 7,767,743 B2 * | 8/2010 | Weng et al. | 524/394 |
| 2007/0197711 A1 | 8/2007 | Ijdo et al. | |
| 2011/0250372 A1 * | 10/2011 | Weng et al. | 428/36.6 |

FOREIGN PATENT DOCUMENTS

| | | |
|---|---|---|
| WO | WO 02/100935 | 12/2002 |
| WO | WO 2006/085957 | 8/2006 |

* cited by examiner

*Primary Examiner* — Hui Chin
(74) *Attorney, Agent, or Firm* — Nancy T. Krawczyk

(57) ABSTRACT

A nanocomposite comprising at least one elastomer and at least one nanofiller. The elastomer comprises units derived from isoolefins having from 4 to 7 carbon atoms and at least one multiolefin. The nanofiller comprise a layered filler and an amine modifier wherein the nanofiller is substantially free of any unassociated amines. By eliminating unassociated amines in the nanofiller, prior to contact with the elastomer, the nanocomposite has improved processability characteristics while maintaining desired impermeability characteristics.

19 Claims, No Drawings

ELASTOMERIC NANOCOMPOSITES, NANOCOMPOSITE COMPOSITIONS, AND METHODS OF MANUFACTURE

FIELD OF THE INVENTION

The present invention is related to elastomeric nanocomposites, compositions comprising the elastomeric compositions, methods of producing nanocomposites, and the use of the nanocomposites in articles. More particularly, the present invention is directed to a halogenated C4 to C7 isoolefin based nanocomposite having improved performance properties and blending characteristics.

BACKGROUND OF THE INVENTION

Rubbery polymers containing a majority of isobutylene units are well known for their low gas permeability, unique damping properties, and low surface energy; these properties make such copolymers particularly desired in applications such as tire innerliners. In order to have a better compatibility or co-curability with other elastomer components in the end applications, at least one unsaturated comonomer and/or comonomer containing reactive functionality is introduced into the isobutylene rubbery polymer. Previously known comonomers include isoprene and styrene. The polymer may be partially brominated to give better compatibility.

The tire industry has always been interested in enhancing the barrier properties of tires. One way to improve the barrier properties is to mix them with layered clays to form an elastomeric nanocomposite. The layered clay can adapt to five different states in the base polymer.

The first state is "particle dispersion" wherein the clay particle size is in the order of microns but uniformly dispersed in the base polymer. The terms aggregate and agglomerate have been used to describe this state.

The second state is an "intercalated nanocomposite" wherein polymer chains are inserted into the layered clay structure, this occurring in a crystallographic regular fashion, regardless of the polymer to clay ratio. Intercalated nanocomposites may typically contain several layers of polymer between organoclay plates. An increase in the gallery spacing of the nanoclay, swollen with rubber, from a pristine state of about 0.3 to 0.7 nm up to about 2.0 to 6.0 nm can be considered as creating an intercalated condition.

The third state is a "flocculated nanocomposite." This is conceptually the same as intercalated nanocomposites; however, the individual clay layers are sometimes flocculated or aggregated due to hydroxylated edge to edge interactions of the clay layers.

The fourth state is an "intercalated—flocculated nanocomposite." The clay plates in the nanocomposite can be separated; however, tactoids or agglomerates can form that have a thickness in the range of 100 to 500 nm.

The fifth state is an "exfoliated nanocomposite." In an exfoliated nanocomposite, the individual clay layers are separated within a continuous polymer by an average distance that depends on the clay concentration or loading in the polymer.

However, in producing an elastomeric nanocomposite, the incompatibility between the hydrophobic polyolefin elastomer and the hydrophilic inorganic clays can make it very difficult to achieve a good clay dispersion or exfoliation within the elastomer. Much effort has been made to modify the clay or the elastomer to make the two elements more compatible. It has been previously shown that better interaction between the functionality on the polymer and clay surface would lead to a higher degree of clay dispersion and exfoliation. This, in turn, will yield elastomeric nanocomposites with enhanced barrier properties.

SUMMARY OF THE INVENTION

The present invention is directed to a nanocomposite having improved capabilities for use in articles requiring impermeability features, such as tire innerliners, tire innertubes, tire curing bladders, hoses, medical stoppers, impermeability sheets, and other similar items.

Disclosed herein is a nanocomposite comprising at least one elastomer and at least one nanofiller. The elastomer comprises units derived from isoolefins having from 4 to 7 carbon atoms and at least one multiolefin. The nanofiller comprises a layered filler and an amine modifier wherein the nanofiller is substantially free of any unassociated amines. By eliminating unassociated amines in the nanofiller, prior to contact with the elastomer, the nanocomposite has improved processability characteristics while maintaining desired impermeability characteristics.

In one disclosed aspect, the nanofiller amine modifier is a secondary amine, tertiary amine, or quaternary amine. If the amine modifier is a quaternary amine, it has the structure of $(R^1R^2R^3R^4)N^+$ wherein $R^1$ is selected from $C_1$ to $C_8$ alkyls, $C_2$ to $C_8$ alkenes, and $C_3$ to $C_8$ aryls, wherein $R^2$ is selected from $C_9$ to $C_{26}$ alkyls, $C_9$ to $C_{26}$ alkenes, and $C_9$ to $C_{26}$ aryls, and wherein $R^3$ and $R^4$ are the same or different and are independently selected from $C_1$ to $C_{26}$ alkyls, $C_2$ to $C_{26}$ alkenes, and $C_3$ to $C_{26}$ aryls.

In one disclosed aspect, the nanofiller amine modifier is selected from the group consisting of dialkyl di-hydrogenated tallow ammonium, dimethyl di-hydrogenated tallow ammonium, benzyl trialkyl ammonium, methyl benzyl dialkyl ammonium, methyl benzyl di-hydrogenated tallow ammonium, dimethyl benzyl hydrogenated tallow ammonium, and dibenzyl dialkyl ammonium.

In another disclosed aspect, the nanocomposite has a Mooney viscosity ($M_L$ 1'+8') @ 125° C. in the range of 35 to 45, and a Mooney viscosity growth percent, after aging of the nanocomposite at 80° C. for 14 days, of not more than 20%.

In other disclosed aspects, the nanocomposite may be blended with secondary elastomers, thermoplastic resins, and/or conventional elastomeric compounding additives selected from the group consisting of fillers, processing oils or resins, and cure packages.

Also disclosed is a method of manufacturing a nanocomposite comprising at least one halogenated elastomer and at least one nanofiller. The method comprises the following steps of a) providing a halogenated elastomer dissolved in a solution, the elastomer comprising units derived from isoolefins having from 4 to 7 carbon atoms and at least one multiolefin, and the solution wherein the solution is selected from the group consisting of solvent, mixture of solvents, or an emulsion consisting of an aqueous phase and immiscible non-aqueous phase; b) adding the nanofiller to the solution, the nanofiller comprising a layered filler and an amine modifier, wherein the nanofiller is substantially free of any unassociated amines; c) contacting the dissolved elastomer and the nanofiller for a sufficient time to permit the nanofiller to exfoliate in the dissolved halogenated elastomer and form a nanocomposite; and d) recovering the nanocomposite from the solution.

In one aspect of the disclosed method, the amine modifier is a secondary amine, tertiary amine, or quaternary amine. When the modifier is a quaternary amine, it has the structure of $(R^1R^2R^3R^4)N^+$ wherein $R^1$ is benzyl derived unit, which may or may not be substituted, wherein $R^2$ is selected from $C_1$ to $C_{26}$ alkyls, $C_2$ to $C_{26}$ alkenes, and $C_3$ to $C_{26}$ aryls, and wherein $R^3$ and $R^4$ are the same or different and are independently selected from $C_9$ to $C_{26}$ alkyls, $C_9$ to $C_{26}$ alkenes, and $C_9$ to $C_{26}$ aryls.

In another aspect of the disclosed method, the nanofiller is added to a second solution prior to adding the nanofiller to the copolymer containing solution. The second solution is selected from the group consisting of solvent, mixture of solvents, or an emulsion consisting of an aqueous phase and immiscible non-aqueous phase.

In the disclosed methods, while contacting the dissolved halogenated elastomer and nanofiller, there is substantially no nucleophilic substitution of the halogen of the elastomer with any amine compounds in the solution.

Also disclosed is a nanocomposite having a Mooney viscosity ($M_L$ 1'+8') @ 125° C. in the range of 35 to 45, and having a Mooney viscosity growth, when aged for 14 days at 80° C., of not more than 20%. The nanocomposite may be further compounded to form elastomeric compounds suitable for use in tires, bladder, hoses, belts, and other reinforced elastomers compounds, or air retaining compounds.

DETAILED DESCRIPTION OF THE INVENTION

Various specific embodiments, versions, and examples of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

DEFINITIONS

Definitions applicable to the presently described invention are as described below.

Rubber refers to any polymer or composition of polymers consistent with the ASTM D1566 definition: "a material that is capable of recovering from large deformations, and can be, or already is, modified to a state in which it is essentially insoluble (but can swell) in boiling solvent . . . ". Elastomer is a term that may be used interchangeably with the term rubber. Elastomeric composition refers to any composition comprising at least one elastomer as defined above.

A vulcanized rubber compound by ASTM D1566 definition refers to "a crosslinked elastic material compounded from an elastomer, susceptible to large deformations by a small force capable of rapid, forceful recovery to approximately its original dimensions and shape upon removal of the deforming force." A cured elastomeric composition refers to any elastomeric composition that has undergone a curing process and/or comprises or is produced using an effective amount of a curative or cure package, and is a term used interchangeably with the term vulcanized rubber compound.

The term "phr" is parts per hundred rubber or "parts", and is a measure common in the art wherein components of a composition are measured relative to a total of all of the elastomer components; this is conventionally a relative weight measurement, but may also be a relative volume measurement. The total phr or parts for all rubber components, whether one, two, three, or more different rubber components is present in a given recipe is always defined as 100 phr. All other non-rubber components are ratioed against the 100 parts of rubber and are expressed in phr. This way, one can easily compare, for example, the levels of curatives or filler loadings, etc., between different compositions based on the same relative proportion of rubber without the need to recalculate percents for every component after adjusting levels of only one, or more, component(s).

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group being replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, isopropyl, normal butyl, isobutyl, secondary butyl, tertiary butyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-dibromobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

Elastomers

Preferred elastomers useful in the practice of this invention include a) polymers derived from at least one $C_4$ to $C_7$ isoolefin monomer and at least one multiolefin monomer and b) homopolymers of $C_4$ to $C_7$ isoolefin monomers. Some such copolymers are conventionally referred to as "butyl rubbers." For the copolymers, the isoolefin derived content in the copolymer is in a range from 70 to 99.5 wt % by weight of the total monomer derived units in one embodiment, and 85 to 99.5 wt % in another embodiment. The total multiolefin derived content in the copolymer is present in the range of mixture from 30 to 0.5 wt % in one embodiment, and from 15 to 0.5 wt % in another embodiment. In yet another embodiment, from 12 to 0.5 wt % of the polymer is multiolefin derived units. In yet another embodiment, from 8 to 0.5 wt % of the polymer is multiolefin derived units. Herein, for the purpose of this invention, multiolefin refers to any monomer having two or more double bonds. In a preferred embodiment, the multiolefin is any monomer comprising two conjugated double bonds and may be an aliphatic or aromatic monomer.

The $C_4$ to $C_7$ isoolefin may selected from compounds such as isobutylene, isobutene, 2-methyl-1-butene, 3-methyl-1- butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, alkylstyrene, and piperylene, and other monomers such as disclosed in U.S. Pat. No. 5,506,316.

When the isoolefin is isobutylene, the elastomers may be referred to as "an isobutylene based elastomer" and refers to an elastomer or a polymer comprising at least 70 mol % isobutylene derived units. One embodiment of the isobutylene based butyl rubber polymer useful in the invention is obtained by reacting 92 to 99.5 wt % of isobutylene with 0.5 to 8 wt % isoprene, or 95 to 99.5 wt % isobutylene with 0.5 wt % to 5.0 wt % isoprene in yet another embodiment.

The elastomer in a desirable embodiment of the invention is halogenated. Halogenated butyl rubber is produced by the halogenation of any of the butyl polymers described above. Halogenation can be carried out by any means, and the invention is not herein limited by the halogenation process. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1.0 to 2.5 wt %.

In accordance with the another embodiment of the present invention, the elastomer is a random copolymer comprising a $C_4$ to $C_7$ isoolefins derived units and alkylstyrene derived units, the copolymer containing at least 85%, more alternatively at least 86.5% by weight of the isoolefin units, about 8 to about 12% by weight alkylstyrene units, and about 1.1 to about 1.5 wt % of a halogen. In one embodiment, the polymer may be a random elastomeric copolymer of a $C_4$ to $C_7$ α-olefin and a methylstyrene containing at about 8 to about 12% by weight methylstyrene, and 1.1 to 1.5 wt % bromine or chlorine. Exemplary materials may be characterized as polymers containing the following monomer units randomly spaced along the polymer chain:

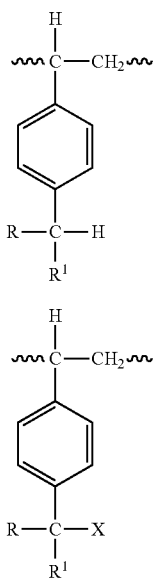

wherein R and $R^1$ are independently hydrogen, lower alkyl, such as a $C_1$ to $C_7$ alkyl and primary or secondary alkyl halides and X is a halogen. In one embodiment, R and $R^1$ are each hydrogen.

Up to 25 mol % of the total alkyl substituted styrene [the total of structures (1) and (2)] present in the random polymer structure may be the halogenated alkyl substituted structure (2) above in one embodiment, and in another embodiment from 10 to 25 mol %. In yet another embodiment, the amount of functionalized structure (2) in the random copolymer itself is from about 0.8 to about 1.10 mol %.

In one embodiment, the elastomer comprises random polymers of isobutylene and para-methylstyrene (PMS) containing from about 5 to about 10 mol % para-methylstyrene, wherein up to 25 mol % of the methyl substituent groups present on the benzyl ring contain a bromine or chlorine atom, such as a bromine atom (para-(bromomethylstyrene)), as well as acid or ester functionalized versions thereof.

In another embodiment, the functionality is selected such that it can react or form polar bonds with functional groups present in the matrix polymer, for example, acid, amino or hydroxyl functional groups, when the polymer components are mixed at high temperatures.

In certain embodiments, the random copolymers have a substantially homogeneous compositional distribution such that at least 95% by weight of the polymer has a para-alkylstyrene content within 10% of the average para-alkylstyrene content of the polymer. Exemplary polymers are characterized by a narrow molecular weight distribution (Mw/Mn) of less than 4.0, alternatively less than 2.5. The copolymers have an exemplary viscosity average molecular weight in the range of from 400,000 up to 2,000,000 and an exemplary number average molecular weight in the range of from 100,000 to 750,000, as determined by gel permeation chromatography.

The random copolymer discussed above may be prepared via slurry polymerization, typically in a diluent comprising a halogenated hydrocarbon(s) such as a chlorinated hydrocarbon and/or a fluorinated hydrocarbon (see U.S. Pat. No. 7,232,872), using a Lewis acid catalyst and optionally a catalyst initiator, followed by halogenation, preferably bromination, in solution in the presence of the halogen and a radical initiator such as heat and/or light and/or a chemical initiator and, optionally, followed by electrophilic substitution of the halogen with a different functional moiety.

Halogenated poly(isobutylene-co-p-methylstyrene) polymers (BIMSM) generally contain from about 0.8 to about 1.1 mol % of halo-methylstyrene groups relative to the total amount of monomer derived units in the copolymer. In another embodiment, the amount of halo-methylstyrene groups is from 0.80 to 1.10 mol %, and from 0.80 to 1.00 mol % in yet another embodiment, and from 0.85 to 1.1 mol % in yet another embodiment, and from 0.85 to 1.0 in yet another embodiment, wherein a desirable range may be any combination of any upper limit with any lower limit. Expressed another way, the copolymers of the present invention contain from about 1.1 to about 1.5 wt % of halogen, based on the weight of the polymer, from 1.1 to 1.5 wt % halogen in another embodiment, and from 1.15 to 1.45 wt % in another embodiment. In a preferred embodiment, the halogen is either bromine or chlorine; in a most preferred embodiment, the halogen is bromine. The polymers are substantially free of ring halogen or halogen in the polymer backbone chain.

Other $C_4$ to $C_7$ isoolefin derived unit containing elastomers suitable for use in the present invention include terpolymers comprising the isoolefin and two multiolefins wherein the multiolefins have different backbone structures prior to polymerization. Such terpolymers include both block and random terpolymers of $C_4$ to $C_8$ isoolefin derived units, $C_4$ to $C_{14}$ multiolefin derived units, and alkylstyrene derived units. One such terpolymer may be formed from isobutylene, isoprene, and alkylstyrene, preferably methylstyrene, monomers.

Another suitable terpolymer may be polymerized from isobutylene, cyclopentadiene, and alkylstyrene monomers. Such terpolymers are obtained under cationic polymerization conditions.

Layered Clay

To form the desired elastomeric nanocomposite, a layered clay is incorporated into the elastomeric polymer. The layered clay is alternatively referred to as a nanoclay due to the size of the clays. Nanoclays have a maximum dimension in the range of from about 0.0001 µm to about 100 µm. The other characteristic of a nanoclay is the high ratio of surface area to volume; this is in distinction to a fine grain carbon black that might have a very small maximum dimension, but which has a low ratio of surface area to volume per grain. This high ratio of surface area to volume provides the nanoclay with a sheet-like structure. Such materials are typically agglomerated, resulting in the layered clay.

The layered clay preferably belongs to the general class of clay minerals with expanding crystal lattices commonly referred to as a "smectite" or "smectite-type clay." By way of example, this may include the dioctahedral smectites which consist of montmorillonite, beidellite, and nontronite, and the trioctahedral smectites, which includes saponite, hectorite, and sauconite. Also encompassed are synthetically prepared smectite-clays.

In yet other embodiments, the layered clay may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminate oxides, hydrotalcite, and the like. Combinations of any of the previous embodiments are also contemplated. These clays typically have at least one naturally occurring cation, or first cation, such as potassium, calcium, or sodium, present within their galleries that are attracted to the net negative charge of the clay surface. For example, clays like montmorillonite may be mined with a naturally occurring cation such as sodium or calcium. The clays have a cationic exchange capacity (CEC) that relates to the ion exchange capacity of the clay, or the total quantity of positive charge that can be absorbed onto the clay surface, expressed in terms of positive charges per unit mass of colloidal particles. Some CEC values for exemplary clay materials are as follows: montmorillonite clays range from 70 to 150 meq/100 g; hallosite clays range from 40 to 50 meq/100 g; and kaolinite clays ranges from 1 to 10 meq/100 g; wherein the milliequivalent (meq) ratio is defined as the number of milliequivalents of the cation, per 100 grams of clay, 100% active basis.

The layered clays described above is modified by intercalation or exfoliation by at least one agent, modifier, or surfactant capable of undergoing ion exchange reactions with the anions present at the interlayer surfaces of the layered filler to render the clay more hydrophobic. The agents, modifiers, or surfactants are selected for their capability of undergoing ion exchange reactions with the anions present at the interlayer surfaces of the layered filler. Suitable compounds are cationic surfactants, preferably amines. The amines may be secondary or tertiary amines having the structure $N^+(R^1R^2R^3)$ wherein $R^1$ and $R^2$ are the same or different and are independently selected from $C_1$ to $C_{26}$ alkyls, $C_2$ to $C_{26}$ alkenes, and $C_3$ to $C_{26}$ aryls and $R^3$ may be hydrogen, a $C_1$ to $C_{26}$ alkyl, a $C_2$ to $C_{26}$ alkene, or a $C_3$ to $C_{26}$ aryl. In one embodiment, $R^1$ and $R^2$ are independently selected from $C_1$ to $C_8$ alkyls, $C_2$ to $C_8$ alkenes, and $C_3$ to $C_8$ aryls, and $R^3$ is selected from hydrogen, $C_9$ to $C_{26}$ alkyls, $C_9$ to $C_{26}$ alkenes, and $C_9$ to $C_{26}$ aryls. In another embodiment, $R^1$ and $R^2$ are independently selected from $C_1$ to $C_8$ alkyls, and $C_2$ to $C_8$ alkenes, $R^3$ is selected from hydrogen, $C_3$ to $C_{26}$ aryl substitution on a $C_1$ to $C_{26}$ alkyl. In another embodiment, $R^1$ is selected from $C_1$ to $C_8$ alkyls, $C_2$ to $C_8$ alkenes, and $C_3$ to $C_8$ aryls, $R^2$ is selected from $C_9$ to $C_{26}$ alkyls, $C_9$ to $C_{26}$ alkenes, and $C_9$ to $C_{26}$ aryls, and $R^3$ is selected from hydrogen, $C_1$ to $C_{26}$ alkyls, $C_2$ to $C_{26}$ alkenes, and $C_3$ to $C_{26}$ aryls. Additionally, in any of the these embodiments, any of the above hydrocarbon substitutions on the nitrogen may be further substituted with $C_1$ to $C_{26}$ alkyl, halogen (bromine or chlorine), sulfoxy (sulfonate or alkyl sulfonate), thiol, alkylthiol, and hydroxyl.

Alternatively, the amine may be a quaternary amine, structurally described as follows:

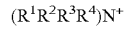

wherein $R^1$, $R^2$, $R^3$, and $R^4$ are the same or different and are independently selected from $C_1$ to $C_{26}$ alkyls, $C_2$ to $C_{26}$ alkenes, and $C_3$ to $C_{26}$ aryls. In one embodiment, $R^1$ and $R^2$ are independently selected from $C_1$ to $C_8$ alkyls, $C_2$ to $C_8$ alkenes, and $C_3$ to $C_8$ aryls, and $R^3$ and $R^4$ are independently selected from $C_9$ to $C_{26}$ alkyls, $C_9$ to $C_{26}$ alkenes, and $C_9$ to $C_{26}$ aryls. In another embodiment, $R^1$ and $R^2$ are independently selected from $C_1$ to $C_8$ alkyls, and $C_2$ to $C_8$ alkenes, $R^3$ is selected from $C_9$ to $C_{26}$ alkyls, and $C_9$ to $C_{26}$ alkenes, and $R^4$ is a $C_3$ to $C_{26}$ aryl substitution on a $C_1$ to $C_{26}$ alkyl. In another embodiment, $R^1$ is selected from $C_1$ to $C_8$ alkyls, $C_2$ to $C_8$ alkenes, and $C_3$ to $C_8$ aryls, $R^2$ is selected from $C_9$ to $C_{26}$ alkyls, $C_9$ to $C_{26}$ alkenes, and $C_9$ to $C_{26}$ aryls, and $R^3$ and $R^4$ are the same or different and are independently selected from $C_1$ to $C_{26}$ alkyls, $C_2$ to $C_{26}$ alkenes, and $C_3$ to $C_{26}$ aryls. Additionally, in any of the these embodiments, any of the above hydrocarbon substitutions on the nitrogen may be further substituted with $C_1$ to $C_{26}$ alkyl, halogen (bromine or chlorine), sulfoxy (sulfonate or alkyl sulfonate), thiol, alkylthiol, and hydroxyl.

Suitable quaternary ammoniums include, but are not limited to, dialkyl di-hydrogenated tallow ammonium, trialkyl hydrogenated tallow ammonium, dimethyl di-hydrogenated tallow ammonium, benzyl trialkyl ammonium, methyl benzyl dialkyl ammonium, methyl benzyl di-hydrogenated tallow ammonium, dimethyl benzyl hydrogenated tallow ammonium, and dibenzyl dialkyl ammonium.

As the modifying agent is added to the clay to undergo ion exchange reactions with the anions present at the interlayer surfaces of the layered filler, the modifying agent is conventionally added to the clay in amounts ranging from less than, equal, or greater than the CEC value for the particular clay. Preferably, the amount of agent will be equal to or greater than the CEC value. For the modifying agent, the milliequivalent ratio is defined as the number of milliequivalents of the ammonium compound, per 100 grams of clay, 100% active basis. The typical clays used in this invention have modifying agents present in amounts of 25 to 150 meq in one embodiment, and 70 to 125 meq in another embodiment. The preferred amount ratio will vary depending on the characteristics of the particular ammonium compound utilized and the desired exfoliation of the clay in the elastomer. In terms of weight ratios of the modified filler, the modifying agent will contain 15 to 60 wt % of the modified filler in one embodiment, and will contain 25 to 45 wt % in another embodiment.

Treatment of the filler with the modifying agents described above results in intercalation or "exfoliation" of the layered platelets as a consequence of a reduction of the ionic forces holding the layers together and introduction of molecules between the nanolayers which serve to space the layers at distances of greater than 4 Å, alternatively greater than 9 Å. This separation allows the layered filler to more readily sorb polymerizable monomer material and polymeric material between the layers and facilitates further delamination of the layers when the intercalate is shear mixed with matrix polymer material to provide a uniform dispersion of the exfoliated layers within the polymer matrix.

With most chemical reactions, there is often a small amount of one of the reactants left in excess after the desired reaction has occurred. Similarly, when modifying the layered filler with a modifying agent or surfactant, a small amount of the modifying agent is left after the treatment. While not wishing to be bond by theory, during further use and compounding of the modified filler, these remaining amounts of, or unassociated, modifying agent, or free amines may interact with the polymer backbone or any constituents connected to the polymer backbone, in particular any halogen, styrene, or benzyl functionality already connected to the polymer. In accordance with the present invention, either during or following treatment of the layered filler with the modifying agent, the nanofiller is treated such that the modified nanofiller is substantially free or absent of any unassociated modifying agents or amines. In particular, the filler is treated so as to be substantially free or absent of any nucleophilic amines, i.e., free or absent of any amines that have an unbonded electron pair.

Alternatively stated, an unassociated or free modifying agent or amine is a compound that has not bonded via the ionic forces on the surface of the filler layers. By "substantially free," the modified filler has not more than 1.5 wt %, or not more than 0.5 wt %, or not more than 0.01 wt % of unassociated modifying agent or amine in the modified nanofiller. The method of treatment of the nanofiller to eliminate any unassociated modifying agent or amines is not critical to the present invention—only that the nanofiller meet the desired criteria of substantially free or completely free of any unassociated modifying agent or amines.

The amount of exfoliated layered filler incorporated in the nanocomposites in accordance with certain embodiments is sufficient to develop an improvement in the mechanical properties or barrier properties of the nanocomposite, for example, tensile strength or oxygen permeability. Amounts generally will range from 0.5 to 20 wt % in one embodiment, from 1 to 15 wt % in another embodiment, from 1 to 10 wt % in another embodiment, and from 1 to 5 wt % in another embodiment, based on the polymer content of the nanocomposite. Expressed in parts per hundred rubber, the exfoliated layered filler is present in the nanocomposite within the range from 4 or 5 phr to 6 or 7 or 8 or 10 or 15 phr.

Nanocomposites can be formed using a variety of processes, such as emulsion blending, solution blending, and melt blending. However, by no means are these processes exhaustive of nanocomposite productions.

Melt Blending

The nanocomposite of the present invention can be formed by a polymer melt blending process. Blending of the components can be carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the nanocomposite.

Emulsion Processes

In the emulsion process, an aqueous slurry of inorganic clay is mixed with a polymer dissolved in a solvent (cement). The mixing should be sufficiently vigorous to form emulsions or micro-emulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a nanocomposite is produced by a process comprising contacting Solution A comprising water and at least one layered clay with Solution B comprising a solvent and at least one elastomer; and removing the solvent and water from the contact product of Solution A and Solution B to recover a nanocomposite. In certain embodiments, the emulsion is formed by subjecting the mixture to agitation using a high-shear mixer.

In some embodiments, a nanocomposite is produced by a process comprising contacting Solution A comprising water and at least one layered clay with Solution B comprising a solvent and at least one elastomer, wherein the contacting is performed in the presence of an emulsifier or surfactant.

The emulsions are formed by subjecting a mixture of the hydrocarbon, water and surfactant when used, to sufficient shearing, as in a commercial blender or its equivalent for a period of time sufficient for forming the emulsion, e.g., generally at least a few seconds. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 wt % of the total emulsion, more preferably about 0.001 to about 3 wt %, and most preferably 0.01 to less than 2 wt %.

Cationic surfactants useful in preparing the emulsions of this invention include tertiary amines, diamines, polyamines, amines, as well as quaternary ammonium compounds. Nonionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

Solution Blending

In the solution process, a nanocomposite is produced by contacting Solution A comprising a hydrocarbon solvent and at least one layered nanofiller or clay with Solution B comprising a solvent and at least one elastomer, and removing the solvents from the contact product of Solution A and Solution B to form a nanocomposite.

The layered nanofiller may be a layered clay treated with organic molecules as described above. In yet another embodiment, a nanocomposite is produced by a process comprising contacting at least one elastomer and at least one layered filler in a solvent; and removing the solvent from the contact product to form a nanocomposite.

In another embodiment, a nanocomposite is produced by a process comprising contacting at least one elastomer and at least one layered filler in a solvent mixture comprising two solvents; and removing the solvent mixture from the contact product to form a nanocomposite.

In still another embodiment, a nanocomposite is produced by a process comprising contacting at least one elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one elastomer and then dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In the embodiments described above, solvents may be present in the production of the nanocomposite composition from 30 to 99 wt %, alternatively from 40 to 99 wt %, alternatively from 50 to 99 wt %, alternatively from 60 to 99 wt %, alternatively from 70 to 99 wt %, alternatively from 80 to 99 wt %, alternatively from 90 to 99 wt %, alternatively from 95 to 99 wt %, based upon the total weight of the composition. Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

Suitable solvents include hydrocarbons such as alkanes, including $C_4$ to $C_{22}$ linear, cyclic, branched alkanes, alkenes, aromatics, and mixtures thereof. Examples include propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyclopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, orthoxylene, para-xylene, meta-xylene, and mixtures thereof.

In another embodiment, suitable solvents include one or more nitrated alkanes, including $C_2$ to $C_{22}$ nitrated linear, cyclic, or branched alkanes. Nitrated alkanes include, but are not limited to nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above, and mixtures thereof.

In another embodiment, suitable solvents include at least one oxygenate, including $C_1$ to $C_{22}$ alcohols, ketones, ethers, carboxylic acids, esters, and mixtures thereof. Other suitable solvents are further described in WO 2006/085957.

Halogenated versions of all of the above may also be used such as chlorinated hydrocarbons, for example, methyl chloride, methylene chloride, ethyl chloride, propyl chloride, butyl chloride, chloroform, and mixtures thereof.

Compounding Additives

The elastomeric nanocomposite may be blended with additional components to achieve a fully compounded elastomer. Possible additional components includes conventional fillers, nanofillers, processing aids and oils, and cure packages.

Conventional elastomeric fillers are, for example, calcium carbonate, silica, non-organic clay, talc, titanium dioxide, and carbon black. One or more of the fillers may be used. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

In one embodiment, the filler is carbon black or modified carbon black, and combinations of any of these. In another embodiment, the filler is a blend of carbon black and silica. Conventional filler amounts for tire treads and sidewalls is reinforcing grade carbon black present at a level of from 10 to 100 phr of the blend, more preferably from 30 to 80 phr in another embodiment, and from 50 to 80 phr in yet another embodiment.

Crosslinking Agents, Curatives, Cure Packages, and Curing Processes

Generally, polymer blends, for example, those used to produce tires, are crosslinked thereby improve the polymer's mechanical properties. It is known that the physical properties, performance characteristics, and durability of vulcanized rubber compounds are directly related to the number (crosslink density) and type of crosslinks formed during the vulcanization reaction.

In certain embodiments of the present invention, the elastomeric compositions and the articles made from those compositions may comprise at least one curative or crosslinking agent to enable the elastomer to undergo a process to cure the elastomeric composition. As used herein, at least one curative package refers to any material or method capable of imparting cured properties to a rubber as commonly understood in the industry. At least one curative package may include any and at least one of the following.

One or more crosslinking agents are preferably used in the elastomeric compositions of the present invention, especially when silica is the primary filler, or is present in combination with another filler. Suitable curing components include sulfur, metal oxides, organometallic compounds, and radical initiators.

Peroxide cure systems or resin cure systems may also be used. However, if the elastomer is being combined with a thermoplastic to form a DVA (where no cross-linking of the thermoplastic is desired), the use of peroxide curative may be avoided if the thermoplastic resin is one such that the presence of peroxide would cause the thermoplastic resin to crosslink.

Sulfur is the most common chemical vulcanizing agent for diene-containing elastomers. It exists as a rhombic eight member ring or in amorphous polymeric forms. A typical sulfur vulcanization system consists of the accelerator to activate the sulfur, an activator, and a retarder to help control the rate of vulcanization. The accelerator serves to control the onset of and rate of vulcanization, and the number and type of sulfur crosslinks that are formed. Activators may also be used in combination with the curative and accelerator. The activate reacts first with the accelerators to form rubber-soluble complexes which then react with the sulfur to form sulfurating agents. General classes of activators include amines, diamines, guanidines, thioureas, thiazoles, thiurams, sulfenamides, sulfenimides, thiocarbamates, xanthates, and the like. Retarders may be used to delay the initial onset of cure in order to allow sufficient time to process the unvulcanized rubber.

Halogen-containing elastomers such as the inventive halogenated poly(isobutylene-co-p-methylstyrene) may be crosslinked by their reaction with metal oxides. The metal oxide is thought to react with halogen groups in the polymer to produce an active intermediate which then reacts further to produce carbon-carbon bonds. Metal halides are liberated as a by-product and can serve as autocatalysts for this reaction. Common curatives include ZnO, CaO, MgO, Al2O3, CrO3, FeO, Fe2O3, and NiO. These metal oxides can be used alone or in conjunction with the corresponding metal fatty acid complex (e.g., the stearate salts of Zn, Ca, Mg, and Al), or with stearic acid and either a sulfur compound or an alkylperoxide compound. More preferably, the coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilypropyl)tetrasulfide (sold commercially as "Si69") is employed.

The mechanism for accelerated vulcanization of elastomers involves complex interactions between the curative, accelerator, activators and polymers. Ideally, all available curative is consumed in the formation of effective crosslinks which join together two polymer chains and enhance the overall strength of the polymer matrix. Numerous accelerators are known in the art and include, but are not limited to, the following: stearic acid, diphenyl guanidine, tetramethylthiuram disulfide, 4,4'-dithiodimorpholine, tetrabutylthiuram disulfide, benzothiazyl disulfide, hexamethylene-1,6-bisthiosulfate disodium salt dihydrate (sold commercially as DURALINK™ HTS by Flexsys), 2-morpholinothio benzothiazole (MBS or MOR), blends of 90% MOR and 10% MBTS (MOR90), N-tertiarybutyl-2-benzothiazole sulfenamide, and N-oxydiethylene thiocarbamyl-N-oxydiethylene sulfonamide, zinc 2-ethyl hexanoate, and thioureas.

Elastomeric compositions typically contain other components and additives customarily used in rubber mixes, such as effective amounts of other nondiscolored and nondiscoloring processing aids, processing oils, pigments, antioxidants, and/or antiozonants.

Secondary Elastomers

In one embodiment, the elastomeric nanocomposite as discussed above may be the sole elastomeric component of a compound; thereby taking full advantage of the above noted benefits. Alternatively, in other embodiments, the inventive copolymer may be blended with a different/secondary elastomeric polymer to obtain a compound having other desired properties or characteristics.

Examples of other elastomeric polymers, or general purpose rubbers, include natural rubbers (NR), polybutadiene rubber (BR), polyisoprene rubber (IR), poly(styrene-co-butadiene) rubber (SBR), poly(isoprene-co-butadiene) rubber (IBR), styrene-isoprene-butadiene rubber (SIBR), ethylene-propylene rubber (EPM), ethylene-propylene-diene rubber (EPDM), and mixtures thereof.

When blended in a compound, the presently disclosed elastomer, either individually or as a blend of different elastomers (i.e., reactor blends, physical blends such as by melt mixing), may be present in the composition from 10 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Such secondary rubbers may be present in the final composition in amounts ranging from 5 to 90 phr. To obtain a greater impermeability, the use of polymers having lesser permeability characteristics will be limited to minor amounts, i.e., less than 50 phr, in the elastomeric blend.

INDUSTRIAL APPLICABILITY

The elastomeric nanocomposite formed in accordance with the present invention preferably has an oxygen transmission rate of 100 cc-mm/m$^2$-day at 40° C. or lower as measured on cured nanocomposite compositions or articles as described herein. Alternatively, the oxygen transmission rate 95 cc-mm/m$^2$-day at 40° C. or lower, 90 cc-mm/m$^2$-day at 40° C. or lower, 85 cc-mm/m$^2$-day at 40° C. or lower, 80 cc-mm/m$^2$-day, as measured on cured nanocomposite compounds, as described herein.

Permeation of a gas or permeability though a membrane such as tire innerliner consists of three distinct processes. First, the gas molecules must dissolve on one side of the membrane, then diffuse across the membrane or liner to the opposite side of lower gas concentration, the rate being dependent on the size of the diffusion gradient, and then evaporate or disperse in the adjacent tire component or other medium. The size of oxygen and nitrogen molecules are 2.9 and 3.1 Angstroms respectively; the activation energy of diffusion is reported to be 49.8 and 50.6 KJ/mol respectively for oxygen and nitrogen. These values clearly suggest that oxygen diffuses more readily than nitrogen, and permeability values for oxygen will be higher than for nitrogen.

Oxygen permeability was measured using a MOCON OxTran Model 2/61. The units of measure are cc-mm/m$^2$-day-mmHg. Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Examples

Examples were made to determine the properties of nanocomposites prepared in accordance with the disclosed invention.

Nanocomposite 1: 10.2 g of organoclay (nanoclay having a dimethyl di-tallow ammonium surfactant—treated to remove free modifiers—from Southern Clay Products, Gonzales, Tex. USA) was added to 400 mL of isohexane. The clay slurry was added to 490 grams of BIMSM cement (copolymer: 10 wt % PMS and 0.85 mol % BrPMS/20.4 wt % solution in hexane). The clay slurry and rubber cement was mixed under high shear conditions for 60 minutes at ambient temperature. The product was precipitated by adding 2000 mL of isopropyl alcohol to the mixture and then dried.

Nanocomposite 2: A 378.5 liter glass-lined reactor was charged with 29.4 kg of BIMSM (copolymer: 10 wt % PMS and 0.85 mol % BrPMS/22.0 wt % solution in hexane), and 45.1 liters of isohexane. After 3000 g of organoclay (nanoclay having a dimethyl di-tallow ammonium surfactant—treated to remove free modifiers—from Southern Clay Products, Gonzales, Tex. USA) was added, the reactor was charged with 25 psig of nitrogen. The reactor contents were circulated by a pump and in-line high shear mixer at 30° C. for 3 hours. The polymer cement was transferred to a steam stripper for removal of the solvent. The resulting nanocomposite was dried using a dewatering expeller and a drying extruder.

Comparative Nanocomposite 1: A 378.5 liter glass lined reactor was charged with 28.2 kg of BIMSM (copolymer: 10 wt % PMS and 0.85 mol % BrPMS/21 wt % solution in hexane), and 81.6 liters of isohexane. After 3000 g of organoclay (nanoclay having a methyl benzyl di-tallow ammonium surfactant; from Southern Clay Products, Gonzales, Tex. USA) the reactor was charged with 25 psig of nitrogen. The reactor contents were circulated by a pump and in-line high shear mixer for 3 hours. The polymer cement was transferred to a steam stripper for removal of the solvent. The resulting nanocomposite was dried using a dewatering expeller and a drying extruder.

Comparative Nanocomposite 2: A 378.5 liter glass lined reactor was charged with 30.4 kg of BIMSM (copolymer: 10 wt % PMS and 0.85 mol % BrPMS/22 wt % solution in hexane), and 66 liters of isohexane. After 3000 g of organoclays (nanoclay having a dimethyl, di-hydrogenated tallow ammonium surfactant, CLOISITE™ 20A from Southern Clay Products, Gonzales, Tex. USA) the reactor was charged with 25 psig of nitrogen. The reactor contents were circulated by a pump and in-line high shear mixer for 3 hours. The polymer cement was transferred to a steam stripper for removal of the solvent. The resulting nanocomposite was dried using a dewatering expeller and a drying extruder.

Compounded samples were prepared using the above inventive nanocomposites and comparative nanocomposite. The following formulation was used for each Sample: 106 parts per hundred rubber (phr) of the nanocomposite, 60.0 phr N660 carbon black, 1.0 phr stearic acid, 1.0 phr zinc oxide, and 1.0 phr MBTS curative. The use of 106 phr nanocomposite provides for 100 phr of elastomeric copolymer and 6 phr clay. The Samples were prepared by mixing 36 grams of the nanocomposite with 20 g carbon black in a Brabender™ mixer at 135° C. at 60 rpm for 7 minutes. The curatives were added, 33 g stearic acid, 0.33 g zinc oxide, and 0.33 g MBTS, and the mixer was operated at 45° C. and 40 rpm for 4 minutes. The nanocompound Samples were cured at 170° C. Specimens were cut for Mocon permeability measurements.

The permeability of the compounds was measured on a Mocon OX TRAN 2/61 instrument at 40° C. The Mooney viscosity values were measuring using ASTM D1646. The Mooney growth of the compound was determined by heating the nanocomposite compounds in a vacuum oven at 80° C. for 14 days, following by measuring the Mooney viscosity again. The values for permeability, Mooney viscosity, and Mooney growth are provided below.

TABLE

| Sample ID | Permeation rate, (cc-mm/m²-day, 40° C.) | Initial Mooney Viscosity ($M_L$ 1' + 8') @ 125° C. | Mooney Viscosity, after aging |
|---|---|---|---|
| Example 1 | 86.13 | 35.3 | (not tested) |
| Example 2 | 88.40 | 43.0 | 51.5 |
| Comparative Example 1 | 86.82 | 45.0 | 59 |
| Comparative Example 2 | 88.00 | 45.4 | 59.7 |

As evident from the data above, the permeation rates for the inventive samples are comparable to the comparative examples. What is significant is the reduced Mooney viscosities and reduced amount of Mooney viscosity growth. By eliminating any unassociated modifying agent in the nanofiller and the resulting nanocomposite, there is a reduction of side chain reactions with the modifying agent and the polymer structure. The resulting nanocomposite has a relatively more stable structure as evidenced by a lower Mooney viscosity growth. This reduced Mooney viscosity growth is a property desired for application and the building of articles incorporating the nanocomposite, providing for improved processability of the nanocomposite as the viscosity of the nanocomposite will not significantly increase during any heat applications or processing steps.

In one embodiment, the nanocomposite compound has an initial (i.e., not aged per the test above) Mooney viscosity value ($M_L$ 1'+8') in the range of 35 to 65. In other embodiments, the nanocomposite compound has an initial Mooney viscosity value ($M_L$ 1'+8') @ 125° C. in the range of 40 to 60, or 40 to 50, or 35 to 45. In another aspect of the nanocomposite compound, the Mooney viscosity growth, measured as a % change in the Mooney viscosity after aging in an oven at 80° C. for 14 days, is not greater than 20%. In another embodiment, the Mooney viscosity growth is not greater than 15%. In yet another embodiment, the Mooney viscosity growth is not greater than 10%.

The invention, accordingly, provides the following embodiments:

A. A nanocomposite comprising at least one elastomer and at least one nanofiller, the elastomer comprising units derived from isoolefins having from 4 to 7 carbon atoms and at least one multiolefin, the nanofiller comprising a layered filler and an amine modifier wherein the nanofiller is substantially free of any unassociated amines.

B. The nanocomposite of embodiment A, wherein the amine modifier is a secondary amine, tertiary amine, or quaternary amine.

C. The nanocomposite of embodiments A or B, wherein the nanocomposite contains no unassociated amines.

D. The nanocomposite of any one, any combination, or all of embodiments A to C, wherein the elastomer comprises 0.5 to 12 wt % of the at least one multiolefin derived units.

E. The nanocomposite of any one, any combination, or all of embodiments A to D, wherein the nanocomposite contains not more than 0.1 mol % of the multiolefin functionalized by any unassociated amine.

F. The nanocomposite of any one, any combination, or all of embodiments A to E, wherein the at least one multiolefin is selected from the group consisting of isoprene, butadiene, 2,3-dimethyl-1,3-buadiene, myrcene, 6,6-dimethyl-fulvene, hexadiene, cyclopentadiene, methylcyclopentadiene, alkylstyrene, and piperylene.

G. The nanocomposite of any one, any combination, or all of embodiments A to F, wherein the elastomer is halogenated with either chlorine or bromine.

H. The nanocomposite of any one, any combination, or all of embodiments A or G, wherein the elastomer is a copolymer having a substantially homogeneous compositional distribution and comprises from about 8 to about 12 wt % of alkylstyrene moieties and from about 1.1 to about 1.5 wt % of a halogen and wherein said copolymer has a ratio of Mw/Mn of less than about 6.

I. The nanocomposite of embodiment H, wherein the alkylstyrene is para-methylstyrene and the isoolefin comprises isobutylene.

J. The nanocomposite of both or either embodiments H or I, wherein the alkylstyrene is functionalized with the halogen, and up to 25 mol % of the alkylstyrene is so functionalized.

K. The nanocomposite of embodiment J, wherein from 10 to 25 mol % of the alkylstyrene is functionalized by the halogen.

L. The nanocomposite of any one, any combination, or all of embodiments A to K, wherein the nanocomposite is blended with a secondary polymer to form a compound, the compound containing from 5 to 90 phr of the nanocomposite.

M. The nanocomposite of embodiment L, wherein the secondary polymer is selected from the group consisting of natural rubbers, polybutadiene rubber, polyisoprene rubber, poly(styrene-co-butadiene) rubber, poly(isoprene-co-butadiene) rubber, styrene-isoprene-butadiene rubber, ethylene-propylene rubber, ethylene-propylene-diene rubber, and mixtures thereof.

N. The nanocomposite of any one, any combination, or all of embodiments A to M, wherein the nanocomposite is blended with at least one component selected from the group consisting of fillers, processing oils, and cure packages.

O. The nanocomposite of any one, any combination, or all of embodiments A to N, wherein the nanocomposite is blended with a thermoplastic polymer selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly(phenylene ether), and mixtures thereof.

P. The nanocomposite of embodiment O, wherein the nanocomposite and the thermoplastic polymer are dynamically vulcanized together under conditions of high shear wherein the nanocomposite is dispersed as fine particles within the thermoplastic polymer.

Q. The nanocomposite of any one, any combination, or all of embodiments A to P, wherein the nanofiller is at least one silicate and is selected from the group consisting of montmorillonite, nontronite, beidellite, bentonite, volkonskoite, laponite, hectorite, saponite, sauconite, magadite, kenyaite, stevensite, vermiculite, halloysite, aluminate oxides, and hydrotalcite.

R. The nanocomposite of any one, any combination, or all of embodiments A to Q, wherein the amine modifier is a quaternary ammonium surfactant having the structure of $(R^1R^2R^3R^4)N^+$ wherein $R^1$ is selected from $C_1$ to $C_8$ alkyls, $C_2$ to $C_8$ alkenes, and $C_3$ to $C_8$ aryls, wherein $R^2$ is selected from $C_9$ to $C_{26}$ alkyls, $C_9$ to $C_{26}$ alkenes, and $C_9$ to $C_{26}$ aryls, and wherein $R^3$ and $R^4$ are the same or different and are independently selected from $C_1$ to $C_{26}$ alkyls, $C_2$ to $C_{26}$ alkenes, and $C_3$ to $C_{26}$ aryls.

S. The nanocomposite of any one, any combination, or all of the embodiments A to R, wherein the modifier is selected from the group consisting of dialkyl di-hydrogenated tallow ammonium, dimethyl di-hydrogenated tallow ammonium, benzyl trialkyl ammonium, methyl benzyl dialkyl ammonium, methyl benzyl di-hydrogenated tallow ammonium, dimethyl benzyl hydrogenated tallow ammonium, and dibenzyl dialkyl ammonium.

T. The nanocomposite of any one, any combination, or all of the embodiments A to S, wherein the nanocomposite or a compound comprising the nanocomposite has a Mooney viscosity ($M_L$ 1'+8') @ 125° C. in the range of 35 to 45, and a Mooney viscosity growth percent, after aging of the nanocomposite at 80° C. for 14 days, of not more than 20%.

U. A nanocomposite comprising at least one elastomer and at least one nanofiller, the elastomer comprising units derived from isoolefins having from 4 to 7 carbon atoms and at least one multiolefin, the nanofiller comprising a layered filler and an amine modifier wherein the nanofiller is treated to reduced the weight percent of an any unassociated amines, wherein the nanocomposite has a Mooney viscosity growth, measured after aging for 14 days at 80° C., of not more than 20%.

V. A nanocomposite of embodiment U, wherein embodiment U may be combined with any one, any combination, or all of the embodiments of A to T.

W. The method of manufacturing a nanocomposite, the nanocomposite comprising at least one halogenated elastomer and at least one nanofiller, the method comprising: a) providing a halogenated elastomer dissolved in a solution, the elastomer comprising units derived from isoolefins having from 4 to 7 carbon atoms and at least one multiolefin, and the solution wherein the solution is selected from the group consisting of solvent, mixture of solvents, or an emulsion consisting of an aqueous phase and immiscible non-aqueous phase; b) adding the nanofiller to the solution, the nanofiller comprising a layered filler and an amine modifier, wherein the nanofiller is substantially free of any unassociated amines; c) contacting the dissolved elastomer and the nanofiller for a sufficient time to permit the nanofiller to exfoliate in the dissolved halogenated elastomer and form a nanocomposite; and d) recovering the nanocomposite from the solution.

X. The method of embodiment W, wherein the amine modifier is a secondary amine, tertiary amine, or quaternary amine.

Y. The method of embodiment W or X, wherein the amine modifier is a quaternary amine having the structure of $(R^1R^2R^3R^4)N^+$ wherein $R^1$ is benzyl derived unit, which may or may not be substituted, wherein $R^2$ is selected from $C_1$ to $C_{26}$ alkyls, $C_2$ to $C_{26}$ alkenes, and $C_3$ to $C_{26}$ aryls, and wherein $R^3$ and $R^4$ are the same or different and are independently selected from $C_9$ to $C_{26}$ alkyls, $C_9$ to $C_{26}$ alkenes, and $C_9$ to $C_{26}$ aryls.

Z. The method of any one, any combination, or all of embodiments W to Y, wherein the nanofiller is added to a second solution prior to adding the nanofiller to the copolymer containing solution, wherein the second solution is selected from the group consisting of solvent, mixture of solvents, or an emulsion consisting of an aqueous phase and immiscible non-aqueous phase.

AA. The method of any one, any combination, or all of embodiments W to Z, wherein the at least one multiolefin is selected from the group consisting of isoprene, butadiene, 2,3-dimethyl-1,3-buadiene, myrcene, 6,6-dimethyl-fulvene, hexadiene, cyclopentadiene, methylcyclopentadiene, alkylstyrene, and piperylene.

BB. The method of any one, any combination, or all of embodiments W to AA, wherein the elastomer is a copolymer having a substantially homogeneous compositional distribution, the isoolefin is isobutylene, and the multiolefin is an alkylstyrene wherein the copolymer contains about 8 to about 12 wt % of alkylstyrene moieties.

CC. The method of any one, any combination, or all of embodiments W to BB, wherein, while contacting the dissolved halogenated elastomer and nanofiller, there is substantially no nucleophilic substitution of the halogen of the elastomer with any amine compounds in the solution.

DD. The method of embodiment W, wherein the nanocomposite may be defined by any one, any combination, or all of the embodiments of B to T.

Compositions comprising the nanocomposites of the invention may be extruded, compression molded, blow molded, injection molded, and laminated into various shaped articles including fibers, films, laminates, layers, industrial parts such as automotive parts, appliance housings, consumer products, packaging, and the like.

The nanocomposite compositions as described above may be used in the manufacture of air membranes such as innerliners, innertubes sidewalls, treads, bladders, and the like used in the production of tires. The invention is not limited to any particular method of manufacture for articles such as innerliners or tires. In particular, the nanocomposites are useful in compositions used in articles for a variety of tire applications such as truck tires, bus tires, automobile tires, motorcycle tires, off-road tires, aircraft tires, and the like.

In another application, elastomeric compositions comprising the nanocomposite may be employed in air cushions, pneumatic springs, air bellows, hoses, accumulator bags, and belts such as conveyor belts or automotive belts. They are useful in molded rubber parts and find wide applications in automobile suspension bumpers, auto exhaust hangers, and body mounts.

Additionally, elastomeric compositions comprising the nanocomposite may also be used as adhesives, caulks, sealants, and glazing compounds. They are also useful as plasticizers in rubber formulations; as components to compositions that are manufactured into stretch-wrap films; as dispersants for lubricants; and in potting and electrical cable filling materials.

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

What is claimed is:

1. A nanocomposite comprising at least one elastomer and at least one nanofiller,
   the elastomer comprising units derived from isoolefins having from 4 to 7 carbon atoms and at least one multiolefin, and
   the nanofiller consisting of a layered filler and an amine modifier, wherein the nanofiller is treated, such that the nanocomposite contains no unassociated amines.

2. The nanocomposite of claim 1, wherein the nanocomposite contains not more than 0.1 mol % of the multiolefin functionalized by any unassociated amines.

3. The nanocomposite of claim 1, wherein the at least one multiolefin is selected from the group consisting of isoprene, butadiene, 2,3-dimethyl-1,3-buadiene, myrcene, 6,6-dimethyl-fulvene, hexadiene, cyclopentadiene, methylcyclopentadiene, alkylstyrene, and piperylene.

4. The nanocomposite of claim 1, wherein the elastomer is halogenated with either chlorine or bromine.

5. The nanocomposite of claim 1, wherein the elastomer is a copolymer having a substantially homogeneous compositional distribution, the isoolefin is isobutylene, and the multiolefin is an alkylstyrene wherein the copolymer contains about 8 to about 12 wt % of alkylstyrene moieties.

6. The nanocomposite of claim 1, wherein the nanocomposite is blended with a secondary elastomer to form a compound, the compound containing from 5 to 90 phr of the nanocomposite.

7. The nanocomposite of claim 1, wherein the nanocomposite is blended with at least one component selected from the group consisting of fillers, processing oils, processing aids, and cure packages.

8. The nanocomposite of claim 1, wherein the nanocomposite is blended with a thermoplastic polymer selected from the group consisting of polyamides, polyimides, polycarbonates, polyesters, polysulfones, polylactones, polyacetals, acrylonitrile-butadiene-styrene polymers, polyphenylene oxide, polyphenylene sulfide, polystyrene, styrene-acrylonitrile polymers, styrene maleic anhydride polymers, aromatic polyketones, poly(phenylene ether), and mixtures thereof.

9. The nanocomposite of claim 8, wherein the nanocomposite and the thermoplastic polymer are dynamically vulcanized together under conditions of high shear wherein the nanocomposite is dispersed as fine particles within the thermoplastic polymer.

10. The nanocomposite of claim 1, wherein the nanofiller is at least one silicate and is selected from the group consisting of montmorillonite, nontronite, beidellite, bentonite, volkonskoite, laponite, hectorite, saponite, sauconite, magadite, kenyaite, stevensite, vermiculite, halloysite, aluminate oxides, and hydrotalcite.

11. The nanocomposite of claim 1, wherein the amine modifier is a secondary, tertiary, or quaternary amine.

12. The nanocomposite of claim 11, wherein the quaternary amine has the structure of $(R^1R^2R^3R^4)N^+$ wherein $R^1$ is selected from $C_1$ to $C_8$ alkyls, $C_2$ to $C_8$ alkenes, and $C_3$ to $C_8$ aryls, wherein $R^2$ is selected from $C_9$ to $C_{26}$ alkyls, $C_9$ to $C_{26}$ alkenes, and $C_9$ to $C_{26}$ aryls, and wherein $R^3$ and $R^4$ are the same or different and are independently selected from $C_1$ to $C_{26}$ alkyls, $C_2$ to $C_{26}$ alkenes, and $C_3$ to $C_{26}$ aryls.

13. The nanocomposite of claim 11, wherein the amine modifier is selected from the group consisting of tetra alkyl ammonium, trialkyl aryl ammonium, and di-alkyl di-aryl ammonium.

14. The nanocomposite of claim 7, wherein the nanocomposite is compounded to form an elastomeric compound, the compound having a Mooney viscosity ($M_L$ 1'+8') @ 125° C. in the range of 35 to 45, and a Mooney viscosity growth, measured after aging for 14 days at 80° C., of not more than 20%.

15. An article comprising the nanocomposite of claim 1, wherein the article is a tire innerliner or a tire bladder or is incorporated as a layer into a tire, a bladder, a hose, a belt, pneumatic spring, or vehicle body mount.

16. A nanocomposite comprising at least one elastomer and at least one nanofiller,
    the elastomer comprising units derived from isoolefins having from 4 to 7 carbon atoms and at least one multiolefin, and
    the nanofiller consisting of a layered filler and an amine modifier,
    wherein the nanocomposite has a Mooney viscosity growth, measured after aging for 14 days at 80° C., of not more than 20%, and the nanocomposite is free of any unassociated modifying amines.

17. The nanocomposite of claim 16, wherein the amine modifier is a secondary, tertiary, or quaternary amine.

18. The nanocomposite of claim 1, wherein the layered filler of the nanofiller is an organoclay.

19. The nanocomposite of claim 16, wherein the layered filler of the nanofiller is an organoclay.

* * * * *